United States Patent
Mishima et al.

[11] Patent Number: 5,599,378
[45] Date of Patent: Feb. 4, 1997

[54] SPINDLE-SHAPED MAGNETIC IRON BASED ALLOY PARTICLES AND PROCESS FOR PRODUCING THE SAME

[75] Inventors: Akio Mishima; Tosiharu Harada, both of Hiroshima; Mamoru Tanihara, Osaka; Yasutaka Ota, Hatsukaichi; Kenji Okinaka; Kohji Mori, both of Hiroshima; Hirofumi Kawasaki, Aki-gun; Norimichi Nagai, Hiroshima; Katsunori Fujimoto, Ube; Yoshiro Okuda, Hiroshima, all of Japan

[73] Assignee: Toda Kogyo Corp., Japan

[21] Appl. No.: 450,205

[22] Filed: May 25, 1995

Related U.S. Application Data

[62] Division of Ser. No. 118,287, Sep. 9, 1993, Pat. No. 5,466,306, which is a continuation of Ser. No. 712,882, Jun. 11, 1991, abandoned.

[30] Foreign Application Priority Data

| Dec. 22, 1988 | [JP] | Japan | 63-325436 |
| Jun. 26, 1990 | [JP] | Japan | 2-168684 |
| Jun. 29, 1990 | [JP] | Japan | 2-173871 |

[51] Int. Cl.⁶ .............. H01F 1/11; H01F 1/36
[52] U.S. Cl. .............. 75/348; 75/349; 75/350; 148/105; 423/594; 423/632; 427/127
[58] Field of Search .............. 75/347–350; 148/105; 427/127; 423/594, 632

[56] References Cited

U.S. PATENT DOCUMENTS

| 4,059,463 | 11/1977 | Aonuma et al. | 75/347 |
| 4,096,316 | 6/1978 | Tamai et al. | 75/347 |
| 4,455,345 | 6/1984 | Miyatuka et al. | 428/332 |
| 4,456,475 | 6/1984 | Hirai et al. | 75/348 |
| 4,514,216 | 4/1985 | Mishima et al. | 148/105 |
| 4,773,931 | 9/1988 | Mishima et al. | 148/308 |
| 4,873,010 | 10/1989 | Takedoi et al. | 252/62.59 |
| 4,990,182 | 2/1991 | Kageyama et al. | 148/311 |
| 5,156,922 | 10/1992 | Mishima et al. | 148/105 |
| 5,260,132 | 11/1993 | Nakazumi et al. | 75/348 |
| 5,411,801 | 5/1995 | Honmyo | 423/632 |

FOREIGN PATENT DOCUMENTS

| 0377933 | 7/1990 | European Pat. Off. |
| 0379776 | 8/1990 | European Pat. Off. |
| 0391743 | 10/1990 | European Pat. Off. |
| 59-232922 | 12/1984 | Japan . |
| 60-21307 | 2/1985 | Japan . |
| 60-21819 | 2/1985 | Japan . |
| 60-36603 | 2/1985 | Japan . |
| 62-158801 | 7/1987 | Japan . |
| 63-242930 | 10/1988 | Japan . |
| 2-51429 | 2/1990 | Japan . |

*Primary Examiner*—George Wyszomierski
*Attorney, Agent, or Firm*—Nixon & Vanderhye

[57] ABSTRACT

Disclosed herein are spindle-shaped magnetic iron based alloy particles containing at least one selected from the group consisting of Ni, Al, Si, P, Co, Mg, B and Zn, which have a particle length of 0.05 to 0.40 μm, a crystallite size of 110 to 180 Å, a specific surface area of 30 to 60 m²/g, a coercive force of 1,300 to 1,700 Oe and a saturation magnetization (σs) of not less than 100 emu/g and a process for producing the same.

8 Claims, 7 Drawing Sheets

(× 30000)

(× 30000)

(× 30000)

(×30000)

(×30000)

(×30000)

(×30000)

SPINDLE-SHAPED MAGNETIC IRON BASED ALLOY PARTICLES AND PROCESS FOR PRODUCING THE SAME This is a divisional of application Ser. No. 08/118,287, filed Sep. 9, 1993, now U.S. Pat. No. 5,466,308 which is an FWC of application Ser. No. 07/712,882 filed Jun. 11, 1991, now abandoned.

BACKGROUND OF THE INVENTION

The present invention relates to spindle-shaped magnetic iron based alloy particles for high-density recording, which have high output characteristics and a low noise level, and a process for producing the same.

Miniaturization, weight reduction and recording-time prolongation of video or audio magnetic recording and reproducing apparatuses have recently shown a remarkable progress. Especially, regarding video tape recorders (VTR) which have rapidly spread wide, the development of smaller-sized and lighter-weight VTR's for longer-time recording have been rapid. With this progress, magnetic recording media such as a magnetic tape have been strongly required to have a higher performance and a higher recording density.

In other words, magnetic recording media are required to have higher output and lower the noise level. For this purpose, it is necessary to improve the residual magnetic flux density (Br), the coercive force, the surface smoothness of the magnetic media and the S/N ratio.

These characteristics of magnetic recording media have close relation to the magnetic particles used for the magnetic recording media. In recent years, magnetic iron based alloy particles have attracted attention due to their coercive force and saturation magnetization which are superior to those of conventional magnetic iron oxide particles, and have been put to practical use as magnetic media such as digital audio tapes (DAT), 8-mm video tapes, Hi-8 tapes and video floppies. Such magnetic iron based alloy particles, however, are also strongly demanded to improve the characteristics.

The relationship between various characteristics of magnetic recording media and the properties of magnetic particles used therefor will be described in the following.

In order to obtain a higher recording performance, magnetic recording media for VTR's are required to improve (1) the video S/N ratio, (2) the chroma S/N ratio and (3) the video frequency characteristics, as is obvious from the description in NIKKEI ELECTRONICS, May 3, pp. 82 to 105 (1976).

In order to improve the video S/N ratio, it is important to make the magnetic particles smaller, and to improve the dispersibility of the magnetic particles in a vehicle, the orientation and the loadings of the magnetic particles in a coating film and the surface smoothness of the magnetic recording media.

It is known that a method of lowering the noise level of a magnetic recording medium by reducing the particle size of the magnetic particles used therefore is effective as a method for improving the video S/N ratio.

The particle size of magnetic particles is often expressed by the value of the specific surface area of the particles. It is generally known that the noise level of a magnetic recording medium has a tendency to lower with the increase in the specific surface area of the magnetic particles used. This phenomenon is shown in, for example, FIG. 1 in Japanese Patent Laid-Open. No. 58-159231. The FIG. 1 shows the relationship between the specific surface area of magnetic metal particles and the noise level of the magnetic tape produced therefrom. With the increase in the specific surface area of the particles, the noise level lowers linearly.

Therefore, the magnetic particles are required to have a large specific surface area in order to lower the noise level and improve the video S/N ratio.

However, if the specific surface area of the magnetic particles becomes too large, it becomes more difficult to disperse the magnetic particles in a vehicle (because the amount of binder per unit surface area of the magnetic particles is reduced) and to improve the orientation and the loadings thereof in the coating film, thereby making it impossible to obtain a good surface smoothness, and consequently it leads to the deterioration of the video S/N ratio. Generally, the increase of the specific surface area solely is rather unfavorable. It is therefore important to select the optimum range of a specific surface area in consideration of the technique of dispersing the magnetic particles in a vehicle.

Regarding the relationship between the magnetic metal particles and the noise, it is known that the crystallite size of the magnetic metal particles has a relation to the noise.

This phenomenon is shown in, for example, FIG. 38 on page 123 of the COLLECTED DATA ON MAGNETIC RECORDING MEDIA, Aug. 15 (1985), published by Synthetic Electronics Research. The FIG. 38 shows the relationship between the crystallite size of the magnetic iron based alloy particles and the noise of the magnetic tape produced therefrom. It is observed from FIG. 38 that with the reduction in the crystallite size of the particles, the noise level is lowered.

It is therefore effective for lowering the noise level of a magnetic recording medium to reduce the crystallite size of the magnetic metal particles as much as possible.

As described above, in order to improve the video S/N ratio and lower the noise level, magnetic particles which are excellent in the dispersibility in a vehicle, and the orientation and the loadings in a coating film, have a small crystallite size, an appropriate range (in particular, about 30 to 60 m$^2$/g) of a specific surface area and a uniform particle size distribution, and contain no dendrites are required.

In order to improve the chroma S/N, it is necessary to improve the surface property and the squareness ratio of the magnetic recording medium. For this purpose, magnetic particles having good dispersibility and orientation property are useful. Such magnetic particles are required to have a large aspect ratio (major axial diameter/minor axial diameter), an uniform particle size distribution and an appropriate range of a specific surface area, and to contain no dendrites.

Furthermore, in order to improve the video frequency characteristics, it is necessary that the magnetic recording medium has a high coercive force (Hc) and a high remanense (Br).

In order to enhance the remanence (Br) of magnetic media, a high coercive force (Hc) is required. It is important for the magnetic particles used for recording media such as video floppies, DAT's, 8-mm video tapes and Hi-8 tapes to have a coercive force of about 1,300 to 1,700 Oe at present.

Since the coercive force of magnetic particles are generally caused by the shape anisotropy, the coercive force has a tendency to increase with the increase in the aspect ratio (major axial diameter/minor axial diameter). On the other hand, the coercive force has a tendency to reduce with the reduction in the crystallite size. Therefore, if the crystallite size is reduced in order to lower the noise level and to improve the video S/N ratio, the coercive force is lowered and it is difficult to improve the video frequency characteristics. Accordingly, the reduction in the small crystallite size while keeping the coercive force as high as possible is required.

Magnetic particles having a large saturation magnetization ($\sigma$s) are necessary for enhancing the residual magnetic flux density (Br) of the magnetic medium, and the residual magnetic flux density (Br) depends upon the dispersibility of the magnetic particles in a vehicle and the orientation and the loadings of the magnetic particles in a coating film.

Although magnetic iron based alloy particles have a larger saturation magnetization than iron oxide magnetic particles, since they are very fine particles having a particle size of not more than 1 μm, the surface activity of the particles is so large that they react with oxygen even they are taken into air after forming an oxide film on the particle surface by the surface oxidation after reduction, resulting in the great deterioration of the magnetic properties, in particular, the saturation magnetization. The deficiency of oxidative stability causes, with the time, the deterioration of the saturation magnetic flux density (Bm) and the residual magnetic flux density (Br) of the magnetic recording medium even after the magnetic particles are coated with some binder as a magnetic coating. The saturation magnetization tends to be lowered to a greater extent as the magnetic iron based alloy particles become finer. Therefore, with the recent pronounced tendency to small magnetic particles, a balance in a large saturation magnetization and oxidization stability becomes to be very important. Thus, the method for the surface oxidization of magnetic iron based alloy particles after reduction is an important problem.

Magnetic iron based alloy particles are generally obtained by heat-treating in a reducing gas goethite particles as the starting material, hematite particles obtained by dehydrating the goethite particles at a high temperature, the goethite particles containing metals other than iron or the hematite particles containing metals other than iron.

As a method of producing goethite particles as the starting material, there are known a method(i) of producing acicular goethite particles comprising adding not less than an equivalent of an alkali hydroxide solution to an aqueous ferrous salt solution to obtain a suspension containing ferrous hydroxide particles and carrying out oxidization by passing an oxygen-containing gas into the suspension at a temperature of not higher than 80° C. and at a pH of not less than 11; and a method(ii) of producing spindle-shaped goethite particles comprising reacting an aqueous ferrous salt solution with an aqueous alkali carbonate solution or a mixture of an aqueous alkali carbonate solution and an aqueous alkali hydroxide solution to obtain a suspension containing $FeCO_3$ or an Fe-containing precipitate and carrying out oxidization by passing an oxygen-containing gas into the suspension.

The acicular goethite particles obtained by the method(i) has a large aspect ratio (major axial diameter/minor axial diameter=not less than 10) but contains dendrites and cannot be said to have an uniform particle size distribution. And the magnetic iron based alloy particles obtained by reduction of these acicular goethite particles have a high coercive force due to the large aspect ratio (major axial diameter/minor axial diameter), but contain dendrites and cannot be said to have an uniform particle size distribution.

On the other hand, the spindle-shaped goethite particles obtained by the method(ii) have an uniform particle size distribution and do not contain any dendrites, but it is difficult to prepare spindle-shaped goethite particles having a large aspect ratio (major axial diameter/minor axial diameter). The preparation becomes more difficult as the particle length produced becomes smaller. The magnetic iron based alloy particles obtained by reduction of these spindle-shaped goethite particles have an uniform particle size distribution and contain no dendrites, so that the dispersibility in a vehicle and the orientation and the loadings thereof in a coating film are excellent, but since the aspect ratio (major axial diameter/minor axial diameter) is small, and as a result it is difficult to obtain particles having a high coercive force.

A method of producing spindle-shaped goethite particles comprising reacting an aqueous alkali carbonate solution with an aqueous ferrous salt solution to obtain a suspension containing $FeCO_3$ and passing an oxygen-containing gas into the suspension in the presence of a carboxylic acid such as citric acid and tartaric acid and a salt thereof is disclosed in Japanese Patent Application Laid-Open (KOKAI) No. 50-80999. In this case, the goethite particles obtained have a small aspect ratio (major axial diameter/minor axial diameter), as seen from the description of the specification: "Spheroidal particles close to spindle-shaped particles or spherical particles are obtained".

Various attempts have heretofore been conducted to increase the aspect ratio (major axial diameter/minor axial diameter) of spindle-shaped goethite particles so as to obtain magnetic iron based alloy particles which have an uniform particle size distribution without containing any dendrite and a high coercive force. For example, the methods are described in Japanese Patent Application Laid-Open (KOKAI) Nos. 59-232922 (1984), 60-21307 (1985), 60-21819 (1985), 60-36603 (1985), 62-158801 (1987) and 2-51429 (1990). The spindle-shaped magnetic iron based alloy particles which are obtained by these methods, however, disadvantageously have a large crystallite size.

Magnetic iron based alloy particles which have an uniform particle size distribution without containing any dendrite, a high coercive force, a small crystallite size and an appropriate range of specific surface area have been strongly demanded.

As a result of studies undertaken by the present inventors so as to solve these problems, it has been found that spindle-shaped magnetic iron based alloy particles which have a large aspect ratio (major axial diameter/minor axial diameter), an uniform particle size distribution without any dendrite, a small crystallite size, an appropriate range of specific surface area, a high coercive force and a large saturation magnetization can be obtained by aging a suspension containing $FeCO_3$ or an Fe-containing precipitate, passing an oxygen-containing gas into the aged suspension containing $FeCO_3$ or an Fe-containing precipitate in the presence of propionic acid or salt thereof to obtain spindle-shaped goethite particles, subjecting the thus-obtained spindle-shaped goethite particles to coating-treatment with some compound, and heat-treating the coated particles in a reducing gas. The present invention has been achieved on the basis of this finding.

SUMMARY OF THE INVENTION

In a first aspect of the present invention, there are provided spindle-shaped magnetic iron based alloy particles containing at least one selected from the group consisting of Ni, Al, Si, P, Co, Mg, B and Zn, which have a particle length (major axial diameter) of 0.05 to 0.40 μm, a crystallite size of 110 to 180 Å, a specific surface area of 30 to 60 m²/g, a coercive force of 1,300 to 1,700 Oe and a saturation magnetization (σs) of not less than 100 emu/g.

In a second aspect of the present invention, there is provided a process for producing spindle-shaped magnetic iron based alloy particles comprising the steps of: adding an aqueous alkali carbonate solution or a mixture of an aqueous alkali carbonate solution and an aqueous alkali hydroxide solution to an aqueous ferrous salt solution so as to obtain a suspension containing $FeCO_3$ or an Fe-containing precipitate; aging the thus-obtained suspension containing $FeCO_3$ or an Fe-containing precipitate; carrying out an oxidization by passing an oxygen-containing gas into the aged suspension containing $FeCO_3$ or an Fe-containing precipitate in the presence of 0.1 to 10.0 mol % of propionic acid or a salt thereof based on Fe at 35° to 70° C. so as to obtain spindle-shaped goethite particles; coating the thus-obtained spindle-shaped goethite particles with at least one compound selected from the group consisting of Ni, Al, Si, P, Co, Mg, B and Zn compounds; and heat-treating the coated particles in a reducing gas.

In a third aspect of the present invention, there is provided a process for producing spindle-shaped goethite particles comprising the steps of: adding an aqueous alkali carbonate solution or a mixture of an aqueous alkali carbonate solution and an aqueous alkali hydroxide solution to an aqueous ferrous salt solution so as to obtain a suspension containing $FeCO_3$ or an Fe-containing precipitate; aging the thus-obtained suspension containing $FeCO_3$ or an Fe-containing precipitate; and carrying out oxidization by passing an oxygen-containing gas into the aged suspension containing $FeCO_3$ or an Fe-containing precipitate in the presence of 0.1 to 10.0 mol % of propionic acid or a salt thereof based on Fe at 35° to 70° C.

DETAILED DESCRIPTION OF THE INVENTION

Figure 1:
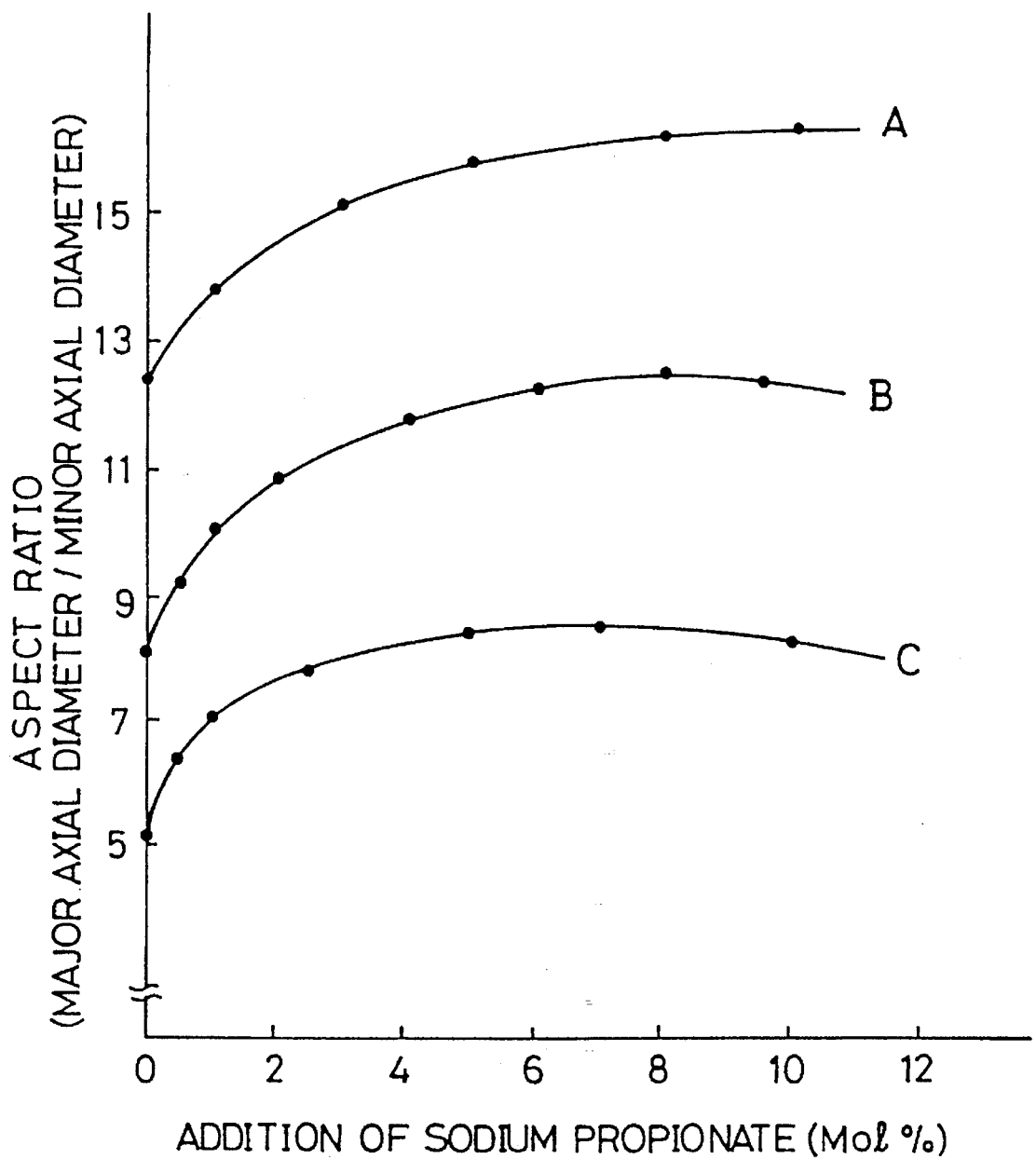
FIG. 1 shows the relationship between the addition of sodium propionate and the aspect ratio (major axial diameter/minor axial diameter) of spindle-shaped goethite particles, wherein the curves A, B and C indicate spindle-shaped goethite particles having particle length of about 0.3 to 0.5 μm, about 0.2 μm and about 0.1 μm, respectively.

The aqueous ferrous salt solution used in the present invention is, for example, an aqueous ferrous sulfate solution and an aqueous ferrous chloride solution.

As the aqueous alkali carbonate solution, aqueous solutions of sodium carbonate, potassium carbonate, ammonium carbonate etc. may be used, and as the aqueous alkali hydroxide solution, aqueous solutions of sodium hydroxide, potassium hydroxide etc. may be used.

The preferred mixing ratio of the aqueous alkali solution (the aqueous alkali carbonate solution or a mixture of the aqueous alkali carbonate solution and the aqueous alkali hydroxide solution) to the aqueous ferrous salt solution is not less than 1.05/1, preferably 1.05/1 to 4.0/1 in the molar ratio (such as 2Na/Fe) of alkali (expressed as sodium carbonate) based on Fe.

The suspension containing $FeCO_3$ or an Fe-containing precipitate is aged at 35° to 60° C. for 50 to 800 minutes in an inert atmosphere by passing an inert gas such as $N_2$ gas in the suspension. The suspension is stirred by bubbling with the gas or by a mechanical operation.

If the aging temperature is lower than 35° C., the aspect ratio (major axial diameter/minor axial diameter) becomes too small. Even if the aging temperature exceeds 60° C., it is possible to obtain the spindle-shaped goethite particles having a large aspect ratio (major axial diameter/minor axial diameter), but it is meaningless to raise the aging temperature to a higher degree than necessary.

If the aging time is less than 50 minutes, it is difficult to obtain the spindle-shaped goethite particles having a large aspect ratio (major axial diameter/minor axial diameter). Even if the aging time exceeds 800 minutes, it is possible to obtain the spindle-shaped goethite particles having a large aspect ratio (major axial diameter/minor axial diameter), but it is meaningless to prolong the aging time more than necessary.

The pH of the suspension at the time of aging is 7 to 11. If the pH is less than 7 or more than 11, it is difficult to obtain the spindle-shaped goethite particles.

The reaction temperature for the oxidization for producing the goethite particles is 35° to 70° C. If the reaction temperature is lower than 35° C., it is difficult to obtain the spindle-shaped goethite particles having a large aspect ratio (major axial diameter/minor axial diameter). If it exceeds 70° C., granular hematite particles become mixed in the spindle-shaped goethite particles.

The oxidization for producing the goethite particles is carried out by passing an oxygen-containing gas (e.g., air) into the suspension. The suspension is stirred by bubbling with the gas or by a mechanical operation. The amount of oxygen-containing gas passed into the suspension and the oxidizing time are appropriately selected in accordance with the scale of a reaction vessel and the amount of suspension treated.

It is necessary to add propionic acid or a salt thereof in the reaction liquid at a stage before passing an oxygen-containing gas thereinto for oxidization. For example, propionic acid or a salt thereof may be added to the aqueous alkali carbonate solution, the mixture of the aqueous alkali carbonate solution and the aqueous alkali hydroxide solution, the ferrous salt solution, or the suspension containing $FeCO_3$ or an Fe-containing precipitate before passing an oxygen-containing gas thereinto for oxidization.

As the salt of propionic acid in the present invention, sodium propionate, potassium propionate, calcium propionate, zinc propionate, cobalt propionate, magnesium propionate etc. may be used.

The amount of propionic acid or the salt thereof is in the range of 0.1 to 10.0 mol % based on Fe.

Addition of less than 0.1 mol % of propionic acid or the salt thereof is ineffective for increasing the aspect ratio (major axial diameter/minor axial diameter) and reducing the crystallite size. Although addition of more than 10.0 mol % of propionic acid and the salt thereof is also effective for increasing the aspect ratio (major axial diameter/minor axial diameter) and reducing the crystallite size, it is meaningless to add propionic acid or the salt thereof more than necessary.

The spindle-shaped goethite particles obtained may be heated at 250° to 350° C. to obtain spindle-shaped hematite particles.

It is preferable to coat the starting material (goethite particles or hematite particles) with at least one compound selected from the group consisting of compounds of Ni, Al, Si, P, Co, Mg, B and Zn in order to keep the particle shape and to prevent sintering between particles. Examples of such a compound are acetates and nitrates of Ni, Al, Co, Mg and Zn, aluminic acid, boric acid, silicic acid and phosphoric acid. Since these compounds have not only a sintering preventive effect but also an activity of controlling the reducing speed, it is preferable to use them in the form of a combination as occasion demands.

Especially, it is preferable to treat the starting material with at least one selected from the group consisting of acetates of Ni, Al, Co, Mg and Zn and nitrates of Ni, Al, Co, Mg and Zn, and then treat it with at least one selected from the group consisting of boric acid, aluminic acid, silicic acid and phosphoric acid.

Thus obtained coated particles are reduced at a temperature range of 300° to 550° C.

If the temperature exceeds 550° C., the reduction rapidly progresses, thereby deforming the particle shape and causing sintering between particles.

If the temperature is lower than 300° C., the progress of the reduction is so slow that it takes a long time.

The flow rate of the reducing gas for the heat treatment and the heat-treating time are appropriately selected in accordance with the scale of a reaction vessel and the amount of particles treated.

As the reducing gas, $H_2$ gas may be used.

The magnetic iron based alloy particles after the heat treatment in the reducing gas can be taken out into air by a known method, for example, the method comprising immersing the magnetic iron based alloy particles in an organic solvent such as toluene or the method comprising replacing the atmosphere around the magnetic iron based alloy particles with an inert gas and then gradually increasing the oxygen content in the inert gas by introducing air until it becomes air so as to carry out oxidization gradually.

Before the heat-treatment in the reducing gas, it is preferable to heat the starting material in a non-reducing atmosphere by a conventional method prior to the reduction in order to control the magnetic properties, the powder properties and the shape of the particles.

The heat treatment in the non-reducing atmosphere may be carried out at a temperature range of 300° to 800° C. in a stream of air, oxygen gas or nitrogen gas.

If the temperature exceeds 800° C., the particle shape is deformed, and sintering between particles is caused.

Furthermore, it is preferable to stabilize the magnetic iron based alloy particles after the heat treatment in the reducing gas by subjecting them to the surface oxidization treatment at 30° to 200° C. in an oxygen-containing gas. The oxygen content in the oxygen-containing gas is preferably 0.02 to 20% by volume. If an oxygen-containing gas in which the oxygen content is less than 0.02% by volume is used, the progress of the oxidization reaction is so slow that it unfavorably takes a long time.

The oxygen-containing gas is ordinarily a mixed gas of air and an inert gas. As an example of the inert gas, $N_2$ gas may be used.

Although the treating temperature of lower than 30° C. produces no problem, the progress of the oxidization reaction is so slow that it unfavorably takes a long time for treating. On the other hand, if it exceeds 200° C. and the mixing ratio is as described above, since the oxidization reaction progresses too rapidly, the magnetic properties, in particular, the saturation magnetization ($\sigma s$) unfavorably lowers.

The surface oxidization-treatment time is appropriately determined in accordance with the treating temperature and the oxygen content in the mixed gas.

Especially, the surface oxidization treatment is preferably carried out in multiple stages by subsequently increasing the oxygen content of the oxygen-containing gas each time the heat generation produced by the oxidization reaction by the gas reaches the peak, as seen from examples described later. The surface oxidization treatment is ordinarily carried out at 30° to 200° C.

In order to improve various properties of magnetic iron based alloy particles, metals other than Fe such as Co, Ni, Cr, Zn, Al, Mn and the like which are ordinarily added when producing the goethite particles as the starting material may be added. In this case, it is also possible to obtain the magnetic iron based alloy particles having a large aspect ratio (major axial diameter/minor axial diameter), a small crystallite size, an appropriate range of a specific surface area and a high coercive force.

The magnetic iron based alloy particles obtained by the above-described method are spindle-shaped and have the following physical properties.

The particle length (major axial diameter) is 0.05 to 0.40 μm, preferably 0.05 to 0.35 μm, and the aspect ratio (major axial diameter/minor axial diameter) is preferably 6 to 20. The crystallite size is 110 to 180 Å, preferably 120 to 180 Å, and the specific surface area is 30 to 60 m$^2$/g, preferably 40 to 60 m$^2$/g. The coercive force is 1,300 to 1,700 Oe, preferably 1,400 to 1,700 Oe, and the saturation magnetization ($\sigma s$) is not less than 100 emu/g, preferably 105 to 140 emu/g. The reduction ratio of the saturation magnetization of the magnetic iron based alloy particles which have been allowed to stand at a temperature of 40° C. and a relative humidity of 70% for 4 days is not more than 12%, preferably not more than 8%. If the saturation magnetization reduction ratio is not more than 12%, the saturation magnetization ordinarily becomes 100 to 140 emu/g.

The particle length is a distance between one end and another end. The particle length is a diameter at the middle.

The magnetic iron based alloy particles may contain at least one selected from the group consisting of Ni, Al, Si, P, Co, Mg, B and Zn, which is added to the magnetic iron based alloy particles at the time of the coating treatment or production of the goethite particles.

It is also possible to obtain more preferable magnetic iron based alloy particles having a crystallite size, a coersive force and a specific surface area which simultaneously satisfy the following relationships:

−8×[crystallite size (Å)]+[coercive force (Oe)]≧110, and [crystallite size (Å)]+2×[specific surface area (m²/g)] ≦290.

The reason why the spindle-shaped goethite particles having a large aspect ratio are obtained in accordance with the present invention is considered to be based on a synergistic effect of the aging process and the oxidization process carried out in the presence of propionic acid or a salt thereof from the fact that it is impossible to obtain spindle-shaped goethite particles having a large aspect ratio both in the case of carrying out oxidization in the absence of propionic acid or the salt thereof after the aging process, and in the case of omitting the aging process and carrying out the oxidization in the presence of propionic acid or a salt thereof.

The reason why the magnetic iron based alloy particles which have an appropriate range of specific surface area and a high coercive force in spite of a small crystallite size are obtained is considered to be as follows.

By the observant electron microscopic observation of the spindle-shaped goethite particles produced by obtaining a suspension containing $FeCO_3$ or an Fe-containing precipitate by adding an aqueous alkali carbonate solution or a mixture of an aqueous alkali carbonate solution and an aqueous hydroxide solution to an aqueous ferrous salt solution and carrying out oxidization by passing an oxygen-containing gas into the suspension, crystals of the long and slender primary particles have grown in the form of a bundle of straws. By a conventional method, since a goethite particle greatly grows in the widthwise direction in compliance of the increase of the number of the primary particles, spindle-shaped particles having a small aspect ratio are apt to be obtained.

In addition, in the case of producing magnetic iron based alloy particles by subjecting the spindle-shaped goethite particles to a sintering preventive treatment and subjecting the resultant particles to heat treatment in a reducing gas by a conventional method, since the growth of the crystals between the long and slender primary particles in the form of a bundle of straws progresses, the crystallite size of the magnetic iron based alloy particles obtained is inevitably larger than that of the magnetic iron based alloy particles produced from acicular goethite particles as the starting material which are obtained by the oxidization of $Fe(OH)_2$.

In contrast, it is considered that in the spindle-shaped goethite particles in the present invention, since it is possible to reduce the growth of a particle in the widthwise direction due to the synergistic effect of the aging process and the oxidization process in the presence of propionic acid or a salt thereof, the aspect ratio thereof is increased and the growth of the primary particles in the widthwise direction during reduction is suppressed by controlling the growth of the goethite particles in the widthwise direction, and as a result, the crystallite size is reduced.

FIG. 1 shows the relationship between the addition of sodium propionate and the aspect ratio of spindle-shaped goethite particles.

In FIG. 1, the goethite particles were obtained in the same way as in Examples 1, 5 and 7, which will be described later, except that 0 to 10 mol % of sodium propionate based on Fe is present therein. The curves A, B and C indicate spindle-shaped goethite particles having particle length of about 0.3 to 0.5 μm, about 0.2 μm and about 0.1 μm, respectively.

As is clear from FIG. 1, the aspect ratio of the spindle-shaped goethite particles has a tendency to increase with the increase of the content of sodium propionate.

Figure 2:
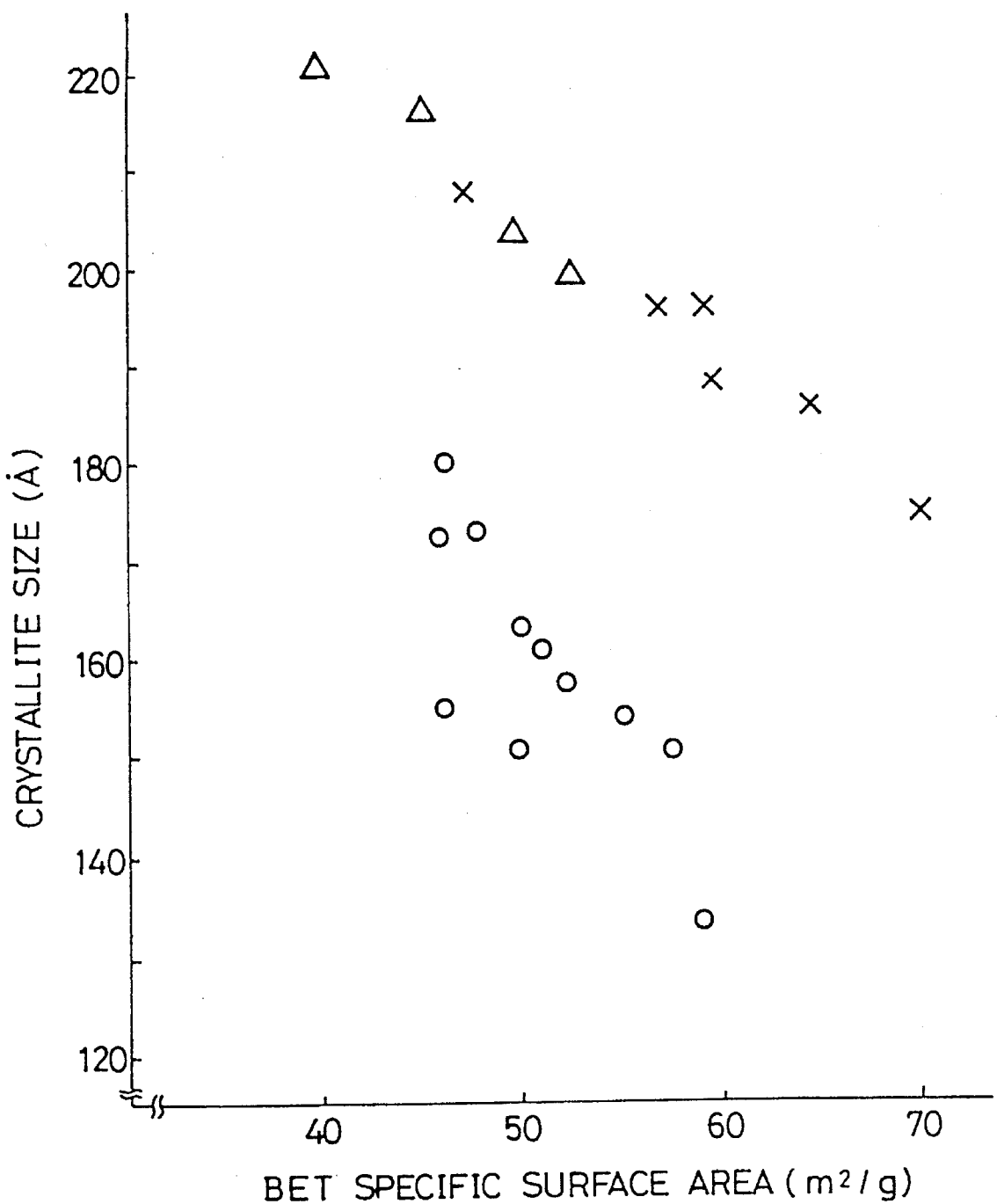
FIG. 2 shows the relationship between the BET specific surface area and the crystallite size of spindle-shaped magnetic iron based alloy particles, wherein the marks Δ and × indicate the spindle-shaped magnetic iron based alloy particles which are obtained by conventional methods, and the mark o indicates the magnetic iron based alloy particles according to the present invention.

FIG. 2 shows the relationship between the BET specific surface area and the crystallite size of spindle-shaped magnetic iron based alloy particles.

In FIG. 2, the marks Δ and × indicate the spindle-shaped magnetic iron based alloy particles which were obtained by conventional methods described in Japanese Patent Application Laid-Open (KOKAI) Nos. 60-36603 and 2-51429, respectively, and the mark o indicates the spindle-shaped magnetic iron based alloy particles according to the present invention. The spindle-shaped magnetic iron based alloy particles according to the present invention have an appropriate specific surface area in spite of the smaller crystallite size than that of the spindle-shaped magnetic iron based alloy particles which were obtained by a conventional method.

Figure 3:
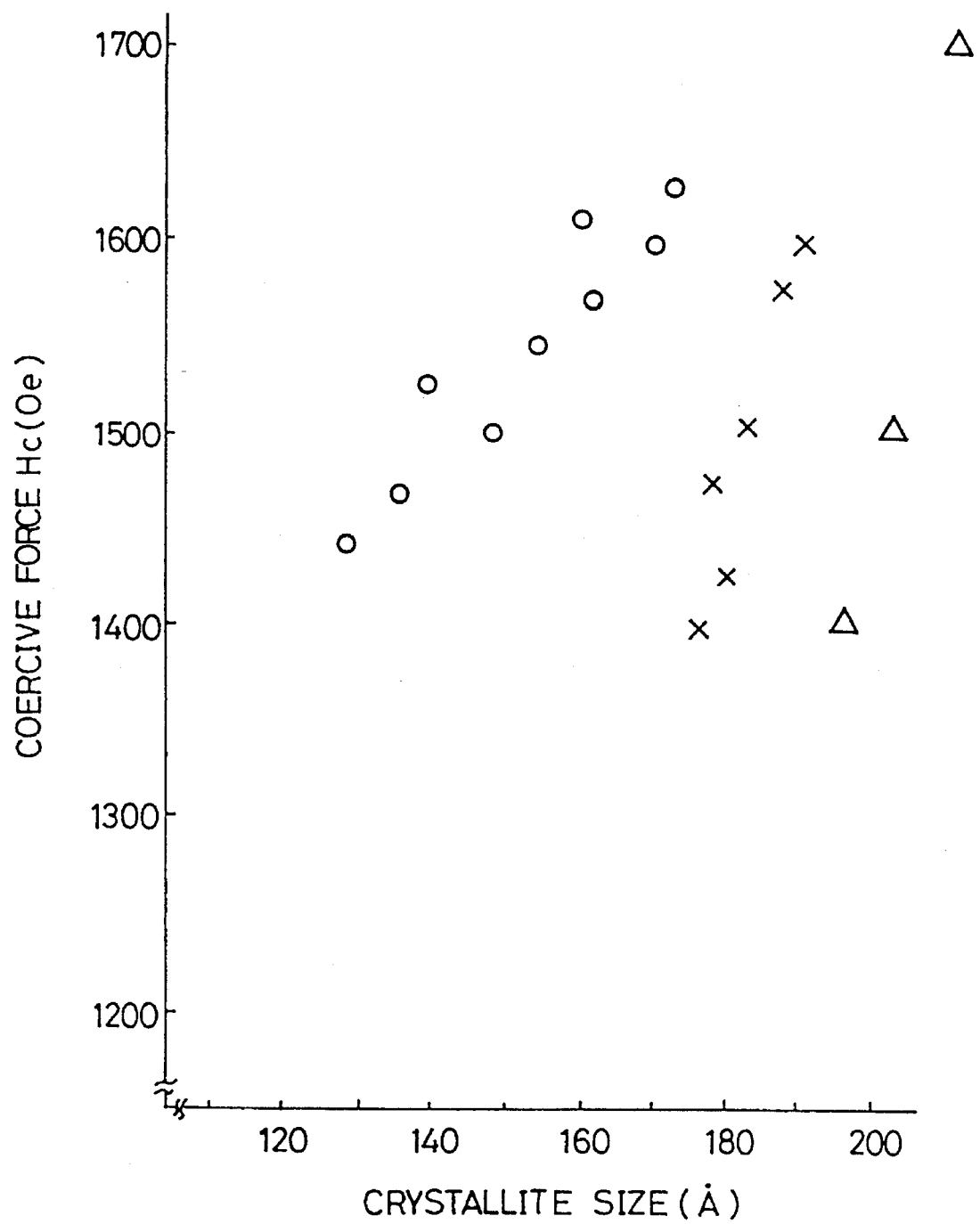
FIG. 3 shows the relationship between the coercive force and the crystallite size of spindle-shaped magnetic iron based alloy particles, wherein the marks Δ and × indicate the spindle-shaped magnetic iron based alloy particles which are obtained by conventional methods, and the mark o indicates the magnetic iron based alloy particles according to the present invention.

FIG. 3 shows the relationship between the coercive force and the crystallite size of spindle-shaped magnetic iron based alloy particles.

In FIG. 3, the marks Δ and × indicate the spindle-shaped magnetic iron based alloy particles which were obtained by conventional methods described in Japanese Patent Application Laid-Open (KOKAI) Nos. 60-36603 and 2-51429, respectively, and the mark o indicates the spindle-shaped magnetic iron bsed alloy particles according to the present invention. The spindle-shaped magnetic iron based alloy particles according to the present invention have a high coercive force in spite of the smaller crystallite size than that of the spindle-shaped magnetic iron based alloy particles which were obtained by a conventional method.

Generally, the crystallite size, the specific surface area etc. are changeable depending upon the environmental conditions, the particle size of the starting material and the like. As is clear from FIGS. 2 and 3, it is difficult to balance such properties with the environmental conditions in the case of using the spindle-shaped magnetic iron bsed alloy particles obtained by a conventional method as the starting material.

Since the spindle-shaped magnetic iron based alloy particles according to the present invention have a large aspect ratio (major axial diameter/minor axial diameter), an uniform particle size distribution without any dendrite, a small crystallite size, an appropriate range of a specific surface area, a high coercive force and a large saturation magnetization, and they are excellent in oxidative stability when they are subjected to surface oxidization treatment, they are suitable as the magnetic particles for high-density recording at a low noise level.

Furthermore, if the spindle-shaped magnetic iron based alloy particles according to the present invention are used for producing a magnetic tape or magnetic disc, the dispersibility in a vehicle is good and it is possible to obtain a good magnetic recording medium having an excellent recording performance and good signal to noise S/N ratio.

EXAMPLES

The present invention will now be explained with reference to the following examples and comparative examples. It is to be understood, however, that the present invention is not restricted by these examples.

(1) The particle length and the aspect ratio (major axial diameter/minor axial diameter) in the following examples and comparative examples are expressed by the average of the values measured from electron micrographs, and the specific surface area is expressed by the value measured from the $N_2$ gas adsorption by a BET method.

(2) The crystallite size is expressed by the diameter of the crystal in the direction perpendicular to the plane measured by X-ray diffraction. The value is calculated from the measured line profile of the diffraction pattern by using the following Scherrer's formula.

$$D_{110} = \frac{K\lambda}{\beta\cos\theta}$$

wherein β: the true half-width of the diffraction peak with the width of the machine subtracted therefrom
K: Scherrer constant (0.9)
λ: the wavelength of X-ray
Θ: Brugg angle (3) The oxidative stability is expressed by the percentage of the saturation magnetization reduction of the particles which was allowed to stand at 40° C., 70% RH for 4 days.

Reduction ratio of the saturation magnetization (%)

$$= \frac{\left(\begin{array}{c}\text{Saturation magnetization}\\\text{just after the production}\end{array}\right) - \left(\begin{array}{c}\text{Saturation magneti-}\\\text{zation after 4 days}\end{array}\right)}{\left(\begin{array}{c}\text{Saturation magnetization}\\\text{just after the production}\end{array}\right)} \times 100$$

<Production of Spindle-Shaped Goethite Particles>

Example 1

600 l of the aqueous solution of 1.35 mol/l of $Na_2CO_3$ containing 1945 g (equivalent to 5.0 mol % based on Fe) of sodium propionate was charged in a reaction vessel which was maintained in a non-oxidizing atmosphere by passing $N_2$ gas thereinto at a rate of 3.4 cm/sec. With this aqueous solution was mixed 300 l of an aqueous ferrous sulfate solution containing 1.35 mol/l of $Fe^{2+}$ at a temperature of 50° C. to produce $FeCO_3$.

The suspension containing $FeCO_3$ was held at 50° C. for 300 minutes while continuously blowing $N_2$ gas thereinto at a rate of 3.4 cm/sec. Thereafter, air was passed into the suspension containing $FeCO_3$ at 50° C. at a rate of 2.8 cm/sec for 5.5 hours to produce yellowish brown precipitated particles. The pH of the suspension during the aeration was 8.5 to 9.5.

The yellowish brown precipitated particles were filtered out, washed with water, dried and pulverized by an ordinary method.

Figure 4:
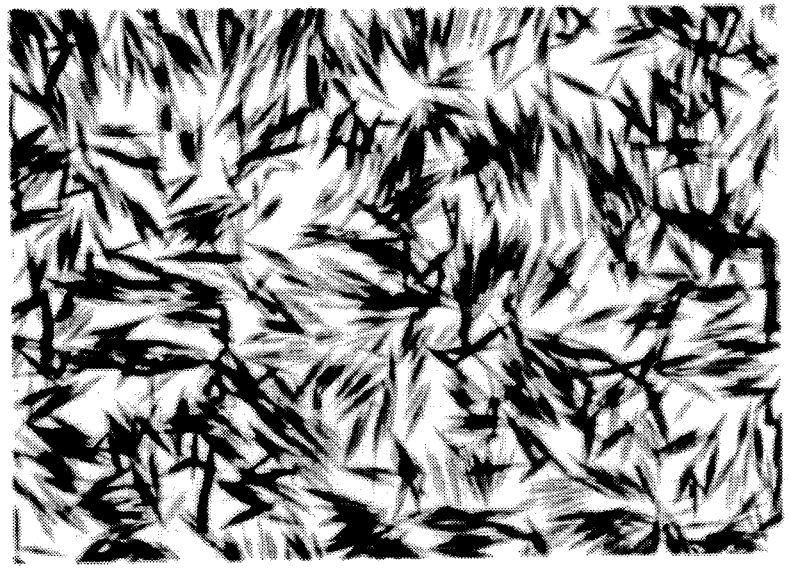
FIGS. 4 to 6 are electron micrographs (×30000) of the spindle-shaped goethite particles obtained in Example 1 and 5, and Comparative Example 1, respectively.

The thus-obtained yellowish brown particles were proved to be goethite particles as a result of X-ray diffraction. As is obvious from the electron microphotograph (×30000) shown in FIG. 4, they were spindle-shaped particles having an average particle length of 0.31 μm and an aspect ratio (major axial diameter/minor axial diameter) of 15.8/1 with a uniform particle size distribution and containing no dendrites.

Examples 2 to 7, Comparative Examples 1 to 3

Spindle-shaped goethite particles were obtained in the same way as in Example 1 except for varying the kind, the concentration and the amount of aqueous alkali carbonate solution used, the kind, the amount and the adding time of propionic acid or a salt thereof, the kind, the concentration and the amount of aqueous ferrous salt solution used, the temperature of the suspension, a addition of an aqueous alkali hydroxide solution in the process of producing the suspension containing an Fe-containing precipitate, the temperature and the time at the aging process, and the temperature and the reaction time at the oxidization process.

The main producing conditions and various properties of the particles obtained are shown in Tables 1 and 2.

Any of the spindle-shaped goethite particles obtained in Examples 2 to 7 had a uniform particle size distribution and contained no dendrites.

Figure 5:
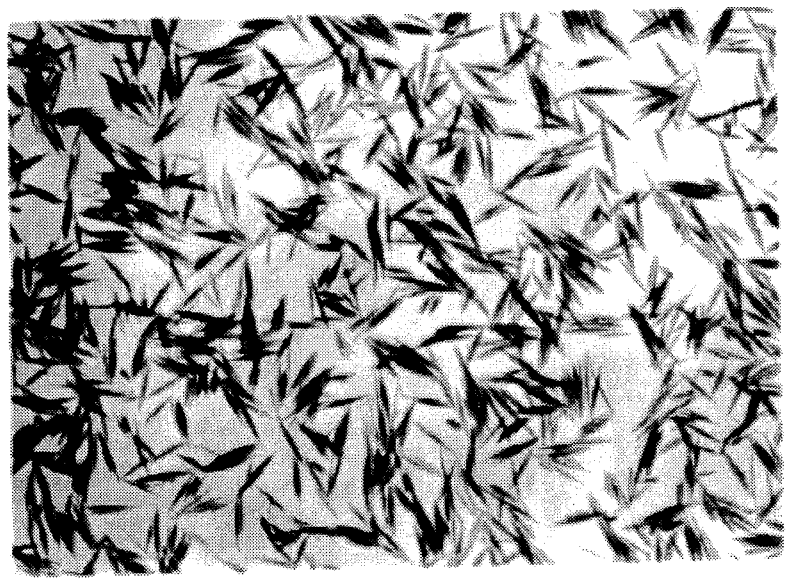

The electron micrograph (×30000) of the spindle-shaped goethite particles obtained in Example 5 is shown in FIG. 5.

Figure 6:
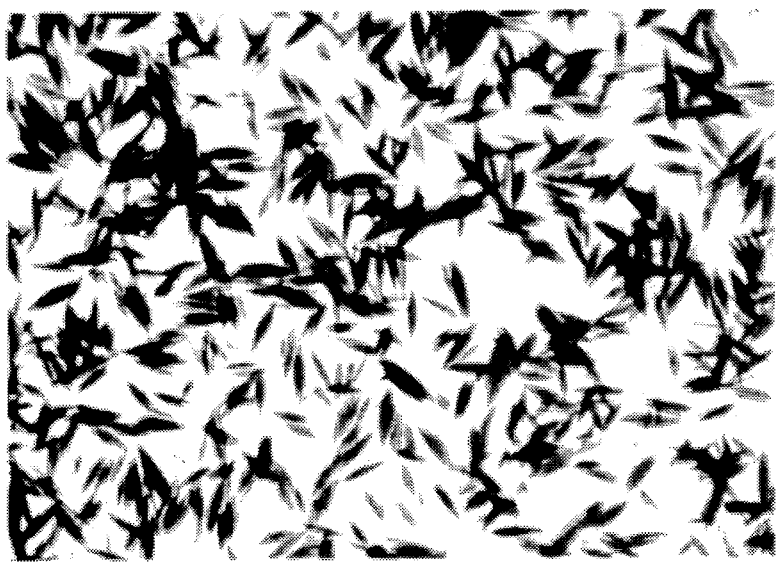

The spindle-shaped goethite particles obtained in Comparative Example 1 had a large particle length and a small aspect ratio (major axial diameter/minor axial diameter), as shown in the electron micrograph (×30000) of FIG. 6.

Example 8

A precipitate of $Co(OH)_2$ was produced by adding 3.65 of a solution of 10.0 mol/l of NaOH to 9.1 l of the aqueous solution of 2.0 mol/l of $CoSO_4 \cdot 7H_2O$. After discharging as much supernatant of the $Co(OH)_2$ precipitate as possible, 36.5 mol of propionic acid was added to the precipitate to prepare 25 l of a cobalt propionate solution in total volume.

600 l of the aqueous solution of 1.35 mol/l of $Na_2CO_3$ was charged in a reaction vessel which was maintained in a non-oxidizing atmosphere by passing $N_2$ gas thereinto at a rate of 3.4 cm/sec. With this aqueous solution was mixed 300 l of an aqueous ferrous sulfate solution containing 1.35 mol/l of $Fe^{2+}$ at a temperature of 48° C. to produce $FeCO_3$.

The cobalt propionate solution prepared in advance was added to the suspension containing $FeCO_3$.

The suspension containing $FeCO_3$ was held at 48° C. for 300 minutes while continuously blowing $N_2$ gas thereinto at a rate of 3.4 cm/sec. Thereafter, air was passed into the suspension containing $FeCO_3$ at 48° C. at a rate of 2.8 cm/sec. for 5.1 hours to produce yellowish brown precipitated particles. The pH of the suspension during the aeration was 8.4 to 9.5.

The yellowish brown precipitated particles were filtered out, washed with water, dried and pulverized by an ordinary method. The main producing conditions and various properties of the particles obtained are shown in Tables 1 and 2.

The thus-obtained yellowish brown particles were proved to be goethite particles as a result of X-ray diffraction. They were spindle-shaped particles having an average particle length of 0.27 μm and an aspect ratio (major axial diameter/minor axial diameter) of 14.8/1 with a uniform particle size distribution and containing no dendrites.

Example 9

Spindle-shaped goethite particles were obtained in the same way as in Example 8 except for using 3.0 mol/l of zinc propionate in place of 4.5 mol/l of cobalt propionate.

The main producing conditions and various properties of the particles obtained are shown in Tables 1 and 2.

The spindle-shaped goethite particles obtained in Example 9 had a uniform particle size distribution and contained no dendrites.

<Production of Spindle-Shaped Hematite Particles>

Example 10 and 11

Spindle-shaped hematite particles were obtained by dehydrating the spindle-shaped goethite particles obtained in Examples 2 and 5 at 300° C. in air.

The hematite particles obtained had an average particle length of 0.36 μm and an aspect ratio (major axial diameter/minor axial diameter) of 15.0/1; and an average particle length of 0.18 μm and an aspect ratio (major axial diameter/minor axial diameter) of 11.0/1, respectively, according to the observation through an electron microscope.

TABLE 1

| | Production of FeCO₃ or Fe-containing precipitate | | | | | | | | |
|---|---|---|---|---|---|---|---|---|---|
| Examples and Comparative example | Aqueous alkali carbonate solution | | | Aqueous alkali hydroxide solution | | | 2Na/Fe | Propionic acid or a salt thereof | | |
| | Kind | Concentration (mol/l) | Amount (l) | Kind | Concentration (mol/l) | Amount (l) | | Kind | Amount (mol %) | Time for addition |
| Example 1 | Na₂CO₃ | 1.35 | 600 | — | — | — | 2.0 | Sodium propionate | 5.0 | A*1 |
| Example 2 | Na₂CO₃ | 1.16 | 420 | NaOH | 1.35 | 180 | 1.5 | Sodium propionate | 5.0 | B*2 |
| Example 3 | K₂CO₃ | 0.675 | 800 | — | — | — | 2.0 | Potassium propionate | 7.0 | D*4 |
| Example 4 | Na₂CO₃ | 1.35 | 600 | — | — | — | 2.0 | Propionic acid | 3.0 | C*3 |
| Example 5 | Na₂CO₃ | 1.20 | 600 | — | — | — | 2.0 | Sodium propionate | 4.0 | A*1 |
| Example 6 | K₂CO₃ | 1.20 | 600 | — | — | — | 2.0 | Sodium propionate | 3.0 | A*1 |
| Example 7 | Na₂CO₃ | 1.10 | 600 | — | — | — | 2.0 | Sodium propionate | 3.0 | A*1 |
| Example 8 | Na₂CO₃ | 1.35 | 600 | — | — | — | 2.0 | Cobalt propionate | 4.5 | D*4 |
| Example 9 | Na₂CO₃ | 1.35 | 600 | — | — | — | 2.0 | Zinc propionate | 3.0 | D*4 |
| Comparative example 1 | Na₂CO₃ | 1.35 | 600 | — | — | — | 2.0 | — | — | — |
| Comparative example 2 | Na₂CO₃ | 1.35 | 600 | — | — | — | 2.0 | Sodium propionate | 5.0 | A*1 |
| Comparative example 3 | Na₂CO₃ | 1.35 | 600 | — | — | — | 2.0 | — | — | — |

| | Production of FeCO₃ or Fe-containing precipitate | | |
|---|---|---|---|
| Examples and Comparative example | Aqueous ferrous salt solution | | |
| | Kind | Concentration (mol/l) | Amount (l) | Temperature (°C.) |
| Example 1 | FeSO₄ | 1.35 | 300 | 50 |
| Example 2 | FeSO₄ | 1.35 | 300 | 50 |
| Example 3 | FeCl₂ | 1.35 | 200 | 42 |
| Example 4 | FeSO₄ | 1.35 | 300 | 55 |
| Example 5 | FeSO₄ | 1.20 | 300 | 45 |
| Example 6 | FeCl₂ | 1.20 | 300 | 40 |
| Example 7 | FeSO₄ | 1.10 | 300 | 40 |
| Example 8 | FeSO₄ | 1.35 | 300 | 48 |
| Example 9 | FeSO₄ | 1.35 | 300 | 48 |
| Comparative example 1 | FeSO₄ | 1.35 | 300 | 50 |
| Comparative example 2 | FeSO₄ | 1.35 | 300 | 50 |
| Comparative example 3 | FeSO₄ | 1.35 | 300 | 50 |

(Note)
*1: A represents an addition of propionic acid or a salt thereof to an aqueous alkali carbonate solution.
*2: B represents an addition of propionic acid or a salt thereof to an aqueous alkali carbonate · alkali hydroxide solution.
*3: C represents an addition of propionic acid or a salt thereof to an aqueous ferrous salt solution.
*4: D represents an addition propionic acid or a salt thereof to a suspension containing FeCO₃.

TABLE 2

| Examples and Comparative example | Aging Temperature (°C.) | Aging Time (min) | Oxidation pH | Oxidation Temperature (°C.) | Reaction time (hour) | Spindle-shaped goethite particles Particle length (μm) | Spindle-shaped goethite particles Aspect ratio (major axial diameter/ minor axial diameter) |
|---|---|---|---|---|---|---|---|
| Example 1 | 50 | 300 | 8.5–9.5 | 50 | 5.5 | 0.31 | 15.8/1 |
| Example 2 | 50 | 60 | 8.4–9.4 | 50 | 5.8 | 0.36 | 15.1/1 |
| Example 3 | 43 | 360 | 8.4–9.3 | 43 | 4.1 | 0.23 | 15.1/1 |
| Example 4 | 55 | 300 | 8.5–9.5 | 56 | 5.6 | 0.47 | 16.2/1 |
| Example 5 | 45 | 150 | 8.5–9.4 | 40 | 5.0 | 0.18 | 11.4/1 |
| Example 6 | 40 | 150 | 8.5–9.3 | 38 | 5.1 | 0.15 | 10.9/1 |
| Example 7 | 40 | 100 | 8.4–9.3 | 36 | 5.0 | 0.10 | 8.8/1 |
| Example 8 | 48 | 300 | 8.4–9.5 | 48 | 5.1 | 0.27 | 14.8/1 |
| Example 9 | 48 | 300 | 8.4–9.5 | 48 | 5.4 | 0.35 | 16.5/1 |
| Comparative example 1 | — | — | 8.5–9.5 | 50 | 4.5 | 0.31 | 7.8/1 |
| Comparative example 2 | — | — | 8.5–9.5 | 50 | 4.5 | 0.30 | 7.5/1 |
| Comparative example 3 | 50 | 300 | 8.5–9.5 | 50 | 5.5 | 0.31 | 12.4/1 |

<Coating of Spindle-Shaped Goethite Particles with Metal Compound>

Example 12

The goethite particles obtained in Example 1 were filtered out and washed with water to obtain a presscake. 4,000 g of the thus-obtained presscake (equivalent to 1,000 g of the the goethite particles) was suspended in 30 l of water. The pH of the suspension was 9.1.

120 g of Al $(NO_3)_3 \cdot 9H_2O$ was added to the suspension so that it was 12.0 wt % of the goethite particles, and the resultant mixture was stirred for 10 minutes.

211 g (21.1 wt %) based on the goethite particles) of $Co(CH_3COO)_2 \cdot 4H_2O$ was then added to the suspension and the mixture was stirred for 10 minutes. The pH of the suspension was 5.03.

A solution of 180 g (18.0 wt % based on the goethite particles) of $H_3BO_3$ was slowly added to the suspension and the suspension and the mixture was stirred for 15 minutes.

After NaOH was further added to the suspension to adjust the pH to 9.5, the suspension was filtered by a filter press, washed with hot water and dried to obtain goethite particles coated with Al, Co and B compounds.

The contents of the elements Al, Co and B in the particles obtained were 0.71 wt %, 4.24 wt % and 0.74 wt % based on the particles, respectively.

The main treating conditions are shown in Table 3.

Examples 13 to 20, Comparative Examples 4 to 6

Spindle-shaped goethite particles were coated in the same way as in Example 12 by varying the kind and amount of Al, Si, P, Ni, Mg, Co, B or Zn compound added.

The main treating conditions are shown in Table 3.

In the Example 16, sodium aluminate were added to the suspension after the pH thereof was adjusted to the range of 7 to 9.

<Production of Spindle-shaped Hematite Particles Coated with Metal Compound>

Example 21

The spindle-shaped hematite particles were obtained by dehydrating the spindle-shaped hematite particles obtained in Example 13 at a temperature of 300° C. in air.

The obtained spindle-shaped hematite particles had an average particle length of 0.36 μm and an aspect ratio (major axial diameter/minor axial diameter) of 15.0/1 according to the observation through an electron microscope.

TABLE 3

| Example and Comparative example | Treated particles (obtained in) | Compound Kind | Compound Amount (wt %) |
|---|---|---|---|
| Example 12 | Example 1 | $Al(NO_3)_3 \cdot 9H_2O$ | 12.0 |
| | | $Co(CH_3COO)_2 \cdot 4H_2O$ | 21.1 |
| | | $H_3BO_3$ | 18.0 |
| Example 13 | Example 2 | $Co(CH_3COO)_2 \cdot 4H_2O$ | 14.0 |
| | | $Ni(CH_3COO)_2 \cdot 4H_2O$ | 1.5 |
| | | $Al(NO_3)_3 \cdot 9H_2O$ | 8.0 |
| | | $H_3BO_3$ | 14.0 |
| Example 14 | Example 3 | Sodium hexametaphosphate | 0.8 |
| | | Sodium silicate | 13.5 |
| | | Sodium aluminate | 7.0 |
| | | $Co(NO_3)_2 \cdot 6H_2O$ | 6.0 |
| Example 15 | Example 4 | $Co(NO_3)_2 \cdot 6H_2O$ | 15.0 |
| | | $Zn(CH_3COO)_2 \cdot 2H_2O$ | 3.0 |
| | | $H_3BO_3$ | 15.0 |
| Example 16 | Example 5 | $Al(NO_3)_3 \cdot 9H_2O$ | 15.0 |
| | | $Co(CH_3COO)_2 \cdot 4H_2O$ | 12.7 |
| | | $H_3BO_3$ | 20.0 |
| Example 17 | Example 6 | $Al(NO_3)_3 \cdot 9H_2O$ | 16.0 |
| | | $Co(NO_3)_2 \cdot 6H_2O$ | 11.0 |
| | | $H_3BO_3$ | 16.0 |
| Example 18 | Example 7 | $Al(NO_3)_3 \cdot 9H_2O$ | 18.0 |
| | | $Co(CH_3COO)_2 \cdot 4H_2O$ | 16.9 |
| | | $H_3BO_3$ | 17.0 |
| Example 19 | Example 8 | $Al(NO_3)_3 \cdot 9H_2O$ | 13.0 |
| | | $Mg(CH_3COO)_2 \cdot 4H_2O$ | 6.5 |
| | | $H_3BO_3$ | 18.0 |
| Example 20 | Example 9 | $Al(NO_3)_3 \cdot 9H_2O$ | 11.0 |
| | | $Co(CH_3COO)_2 \cdot 4H_2O$ | 16.9 |
| | | $H_3BO_3$ | 20.0 |
| Comparative example 4 | Comparative example 1 | $Al(NO_3)_3 \cdot 9H_2O$ | 9.0 |
| | | $Co(CH_3COO)_2 \cdot 4H_2O$ | 12.7 |
| | | $H_3BO_3$ | 15.0 |
| Comparative example 5 | Comparative example 2 | $Al(NO_3)_3 \cdot 9H_2O$ | 9.0 |
| | | $Co(CH_3COO)_2 \cdot 4H_2O$ | 12.7 |
| | | $H_2BO_3$ | 15.0 |
| Comparative example 6 | Comparative example 3 | $Al(NO_3)_3 \cdot 9H_2O$ | 9.0 |
| | | $(CH_3COO)_2 \cdot 4H_2O$ | 12.7 |
| | | $H_3BO_3$ | 15.0 |

Example 22

The goethite particles obtained in Example 1 were filtered out and washed with water to obtain a presscake. The thus-obtained presscake equivalent to 10 kg of the goethite particles was suspended in 200 l of water. The pH of the suspension was 9.2.

1.3 kg (13.0 wt % based on the goethite particles) of $Al(NO_3)_3 \cdot 9H_2O$ was added to the suspension. 2.32 kg (23.2 wt % based on the goethite particles) of $Co(CH_3COO)_2 \cdot 4H_2O$ was further added to the suspension and the mixture was stirred for 15 minutes. The pH of the suspension was 4.70.

After NaOH was added to the suspension to adjust the pH to 9.8, 150 g (1.5 wt % based on the goethite particles) of oleic acid was added.

After the suspension was thoroughly washed with hot water of 60° C. by a rotary filter, 1.5 kg of $H_3BO_3$ was added (15 wt % based on the goethite particles) and the mixture was stirred for 20 minutes.

The suspension was further filtered by a filter press and dried to obtain goethite particles coated with Al, Co and B compounds.

The contents of the elements Al, Co and B in the particles obtained were 0.89 wt %, 5.32 wt % and 0.68 wt % based on the particles, respectively.

The main treating conditions are shown in Table 4.

Examples 23 to 30, Comparative Examples 7 to 9

Spindle-shaped goethite particles were coated in the same way as in Example 22 by varying the kind and amount of Al, Si, P, Ni, Mg, Co, B or Zn compound added.

The main treating conditions are shown in Table 4.

In the Example 23, sodium aluminate was added to the suspension after pH thereof was adjusted to the range of 7 to 9.

In the Example 25, sodium hexametaphosphate and sodium silicate were added to the suspension after pH thereof was adjusted to the range of 7 to 9.

TABLE 4

| Example and Comparative example | Treated particles (obtained in) | Compound Kind | Amount (wt %) |
|---|---|---|---|
| Example 22 | Example 1 | $Al(NO_3)_3 \cdot 9H_2O$ | 13.0 |
| | | $Co(CH_3COO)_2 \cdot 4H_2O$ | 23.2 |
| | | $H_3BO_3$ | 15.0 |
| Example 23 | Example 10 | $Co(CH_3COO)_2 \cdot 4H_2O$ | 16.9 |
| | | $Zn(CH_3COO)_2 \cdot 2H_2O$ | 1.7 |
| | | Sodium aluminate | 8.0 |
| | | $H_3BO_3$ | 12.0 |
| Example 24 | Example 3 | $Co(CH_3COO)_2 \cdot 4H_2O$ | 12.7 |
| | | $Ni(CH_3COO)_2 \cdot 4H_2O$ | 2.8 |
| | | $Al(NO_3)_3 \cdot 9H_2O$ | 11.0 |
| | | $H_3BO_3$ | 14.0 |
| Example 25 | Example 4 | Sodium hexametaphosphate | 0.6 |
| | | Sodium silicate | 13.0 |
| | | $Co(NO_3)_2 \cdot 6H_2O$ | 8.4 |
| | | $H_3BO_3$ | 10.0 |
| Example 26 | Example 11 | $Al(NO_3)_3 \cdot 9H_2O$ | 14.0 |
| | | $Co(NO_3)_2 \cdot 6H_2O$ | 23.2 |
| | | $H_3BO_3$ | 16.0 |
| Example 27 | Example 6 | $Al(NO_3)_3 \cdot 9H_2O$ | 15.0 |
| | | $Co(CH_3COO)_2 \cdot 4H_2O$ | 21.1 |
| | | $H_3BO_3$ | 18.0 |
| Example 28 | Example 7 | $Al(NO_3)_3 \cdot 9H_2O$ | 16.5 |
| | | $Co(NO_3)_2 \cdot 6H_2O$ | 25.3 |
| | | $H_3BO_3$ | 20.0 |
| Example 29 | Example 8 | $Al(NO_3)_3 \cdot 9H_2O$ | 12.0 |
| | | $Mg(CH_3COO)_2 \cdot 4H_2O$ | 5.0 |
| | | $H_3BO_3$ | 16.0 |
| Example 30 | Example 9 | $Al(NO_3)_3 \cdot 9H_2O$ | 12.0 |
| | | $Co(CH_3COO)_2 \cdot 4H_2O$ | 16.9 |
| | | $H_3BO_3$ | 18.0 |
| Comparative example 7 | Comparative example 1 | $Al(NO_3)_3 \cdot 9H_2O$ | 11.0 |
| | | $Mg(CH_3COO)_2 \cdot 4H_2O$ | 6.0 |
| | | $H_3BO_3$ | 14.0 |
| Comparative example 8 | Comparative example 2 | $Al(NO_3)_3 \cdot 9H_2O$ | 11.0 |
| | | $Mg(CH_3COO)_2 \cdot 4H_2O$ | 6.0 |
| | | $H_3BO_3$ | 14.0 |
| Comparative example 9 | Comparative example 3 | $Al(NO_3)_3 \cdot 9H_2O$ | 11.0 |
| | | $Mg(CH_3COO)_2 \cdot 4H_2O$ | 6.0 |
| | | $H_3BO_3$ | 14.0 |

<Production (I) of Spindle-Shaped Magnetic Iron Based Alloy Particles Containing Iron as the Main Ingredient>

Example 31

700 g of the spindle-shaped goethite particles coated with Al, Co and B compounds obtained in Example 12 were heat-treated at 410° C. in air to obtain spindle-shaped hematite particles coated with Al, Co and B compounds.

100 g of the spindle-shaped hematite particles coated with Al, Co and B compounds were charged in about 10 l rotary retort reducing vessel and $H_2$ gas was passed into the vessel at a rate of 40 l/min while rotating the vessel to reduce the hematite particles at a reducing temperature of 400° C.

The magnetic iron based alloy particles containing Al, Co and B which were obtained by the reduction were taken out while being immersed in toluene liquid so as to prevent from rapid oxidization which may be caused when taken out into air.

A part of the particles were taken out and stable oxide coating films were formed on the surfaces while evaporating toluene.

Figure 7:
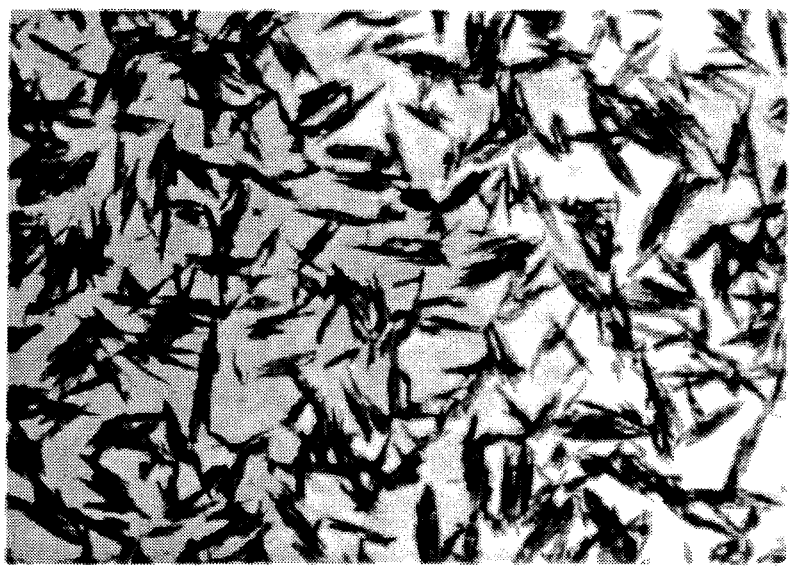
FIGS. 7 to 10 are electron micrographs (×30000) of the spindle-shaped magnetic iron based alloy particles obtained in Example 31, 35, 41 and 46, respectively.

As is obvious form the electron microphotograph (×30000) shown in FIG. 7, the magnetic iron based alloy particles containing Al, Co and B were fine particles having an average particle length of 0.27 μm, an aspect ratio (major axial diameter/minor axial diameter) of 14.8/1, a specific surface area of 49.8 $m^2/g$ and a crystallite size of 160 Å with a uniform particle size distribution and containing no dendrites.

As to the magnetic properties, the coercive force (Hc) was 1,550 Oe and the saturation magnetization ($\sigma$s) was 156.9 emu/g.

Examples 32 to 40, Comparative Examples 10 to 12

Magnetic iron based alloy particles were obtained in the same way as in Example 31 except for varying the kind of the starting material, the heat-treating temperature, the kind of the non-reducing atmosphere, the reducing temperature and the flow rate of $H_2$ gas.

The main producing conditions and various properties of the particles obtained are shown in Table 5.

Any of the spindle-shaped magnetic iron based alloy particles which were obtained in Examples 31 to 40 had a uniform particle size distribution without containing any dendrites.

Figure 8:

The magnetic iron based alloy particles which were obtained in Example 35 are shown in an electron micrograph (×30000) of FIG. 8.

TABLE 5

| Example and Comparative example | Coated particles (obtained in) | Heat treatment in a non-reducing atomospher | | Heat treatment in a reducing gas | | Properties of the magnetic iron based alloy particles | |
|---|---|---|---|---|---|---|---|
| | | Temperature (°C.) | Kind of the non-reducing atomospher | Temperature (°C.) | Flow rate of $H_2$ (l/min) | Particle length (μm) | Aspect ratio (major axial diameter/minor axial diameter) |
| Example 31 | Example 12 | 410 | Air | 400 | 40 | 0.27 | 14.8/1 |
| Example 32 | Example 13 | 400 | $N_2$ gas | 380 | 40 | 0.30 | 14.6/1 |
| Example 33 | Example 14 | — | — | 430 | 40 | 0.19 | 13.0/1 |
| Example 34 | Example 15 | 530 | Air | 370 | 40 | 0.40 | 15.3/1 |
| Example 35 | Example 16 | 430 | Air | 375 | 50 | 0.14 | 9.2/1 |
| Example 36 | Example 17 | 380 | Air | 370 | 50 | 0.13 | 8.4/1 |
| Example 37 | Example 18 | 400 | Air | 360 | 70 | 0.088 | 7.3/1 |
| Example 38 | Example 19 | 410 | Air | 380 | 50 | 0.24 | 14.0/1 |
| Example 39 | Example 20 | 410 | Air | 390 | 50 | 0.30 | 16.0/1 |
| Example 40 | Example 21 | — | — | 350 | 60 | 0.26 | 12.0/1 |
| Comparative example 10 | Comparative example 4 | 410 | Air | 400 | 40 | 0.20 | 6.2/1 |
| Comparative example 11 | Comparative example 5 | 400 | Air | 400 | 40 | 0.23 | 6.7/1 |
| Comparative example 12 | Comparative example 6 | 400 | Air | 400 | 40 | 0.25 | 10.1/1 |

| Example and Comparative example | Coated particles (obtained in) | Properties of the magnetic iron based alloy particles | | | |
|---|---|---|---|---|---|
| | | Crystallite Size (Å) | Specific surface area ($m^2/g$) | Coercive force (Oe) | Saturation magnetization ($\sigma s$) (emu/g) |
| Example 31 | Example 12 | 160 | 49.8 | 1550 | 156.9 |
| Example 32 | Example 13 | 155 | 48.7 | 1530 | 159.1 |
| Example 33 | Example 14 | 172 | 51.3 | 1625 | 158.7 |
| Example 34 | Example 15 | 153 | 47.8 | 1465 | 157.3 |
| Example 35 | Example 16 | 148 | 52.4 | 1590 | 159.5 |
| Example 36 | Example 17 | 140 | 55.4 | 1526 | 158.4 |
| Example 37 | Example 18 | 135 | 58.7 | 1500 | 157.6 |
| Example 38 | Example 19 | 150 | 50.4 | 1638 | 157.6 |
| Example 39 | Example 20 | 147 | 52.0 | 1650 | 158.4 |
| Example 40 | Example 21 | 160 | 45.8 | 1445 | 145.3 |
| Comparative example 10 | Comparative example 4 | 210 | 47.0 | 1050 | 158.3 |
| Comparative example 11 | Comparative example 5 | 190 | 67.3 | 1350 | 159.6 |
| Comparative example 12 | Comparative example 6 | 188 | 60.3 | 1530 | 156.8 |

<Production (II) of Spindle-Shaped Magnetic Iron Based Alloy Particles>

Example 41

5.0 kg of the spindle-shaped goethite particles coated with Al, Co and B compounds obtained in Example 22 were heat-treated at 400° C. in air to obtain spindle-shaped hematite particles coated with Al, Co and B compounds.

2000 g of the spindle-shaped hematite particles coated with Al, Co and B compounds were changed in a fluidized bed reducing furnace, and $H_2$ gas was passed in to the furnace at a rate of 180 l/min to reduce the hematite particles at a reducing temperature of 390° C. for 15 hours.

After the reduction, $H_2$ gas was replaced by $N_2$ gas and the particles were cooled to 50° C. while blowing $N_2$ gas thereinto at a rate of 160N l/min. While maintaining the temperature of the furnace at 50° C., $N_2$ gas and air which were mixed in the ratio of 160N l/min to 0.2N l/min in the flow rate were passed into the furnace. When it was observed that the heat generation by the mixed gas having the above mixing ratio had reached the peak, the flow rate of air was raised to 0.4N l/min so as to increase the air ratio in the mixed gas. In this way, the air ratio in the mixed gas was sequentially raised by raising it when the peak of the heat generation by the oxidization was observed and finally oxidization was continued with air and $N_2$ gas mixed in the ratio of 1.2N l/min to 160N l/min in the flow rate until no heat was produced by the oxidization and the temperature of the particles became about 50° C. which was almost the same as the temperature of the furnace. During this process, the temperature of the particles had reached 75° C. at the highest.

The air mixing ratio was then gradually raised while maintaining the temperature of the furnace at 50° C. and the flow rate of the $N_2$ gas at 160N l/min until the flow rate of air was 20N l/min. During this process, no heat was observed.

While further passing air and $N_2$ gas mixed in the ratio of 40N l/min to 140N l/min in the flow rate into the furnace, the temperature of the particles was cooled to room temperature.

The mixed gas was then replaced by $N_2$ gas by reducing the air flow rate to 0 l/min and the thus-obtained spindle-shaped magnetic iron based alloy particles with surface coating films formed on the surfaces were collected.

Figure 9:
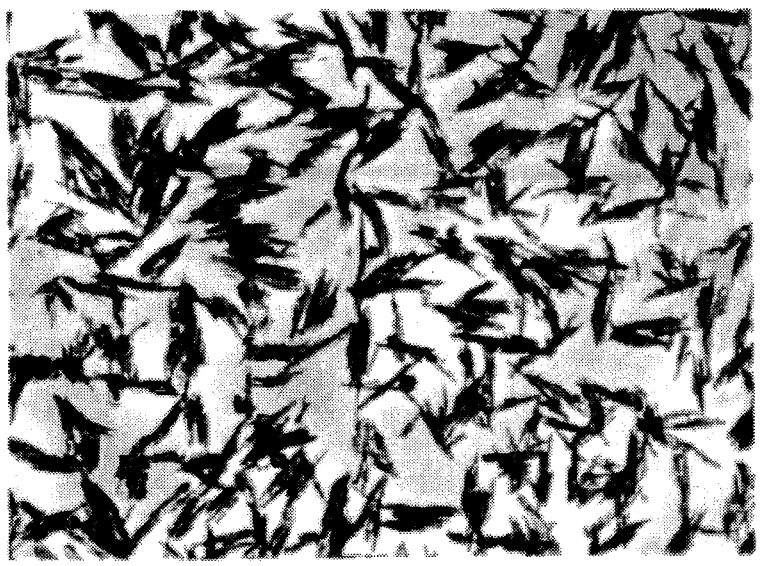

As is obvious from the electron micrograph (×30000) shown in FIG. 9, the magnetic iron based alloy particles containing Al, Co and B were fine particles having an average particle length of 0.28 μm, an aspect ratio (major axial diameter/minor axial diameter) of 15.0/1, a specific surface area of 49.2 m²/g and a crystallite size of 155 Å with a uniform particle size distribution and containing no dendrites.

As to the magnetic properties, the coercive force (Hc) was 1,530 Oe, the saturation magnetization (σs) was 135.4 emu/g and the reduction ratio of saturation magnetization was 4.2%.

Examples 42 to 50, Comparative Examples 13 to 15

Magnetic iron based alloy particles were obtained in the same way as in Example 41 except for varying the kind of the starting material, the heat-treatment temperature, the kind of the non-reducing atmosphere, the reducing temperature, the flow rate of $H_2$ and the surface oxidizing conditions.

The main producing conditions and various properties of the particles obtained are shown in Table 6.

Any of the spindle-shaped magnetic iron based alloy particles which were obtained in Examples 42 to 50 had a uniform particle size distribution without containing any dendrites.

Figure 10:
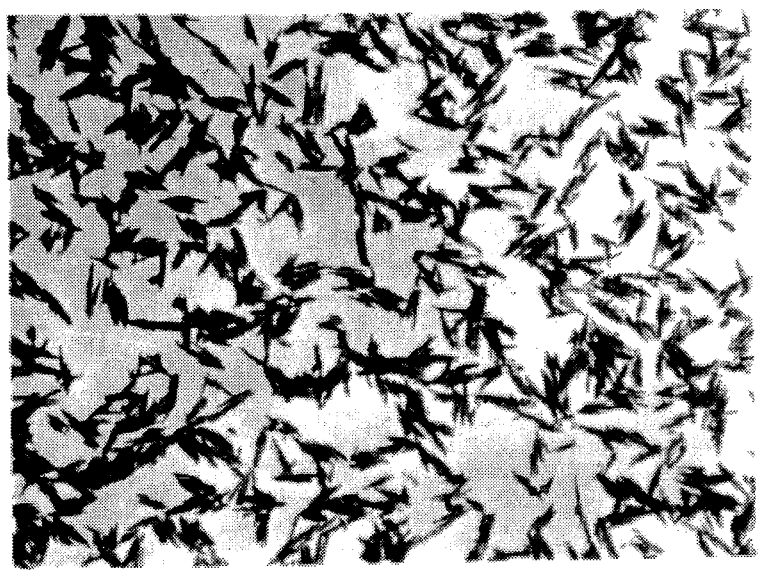

The magnetic iron based alloy particles which were obtained in Example 46 are shown in an electron micrograph (×30000) of FIG. 10.

The magnetic iron based alloy particles obtained after reduction in Comparative Examples 13 to 15 were taken out while being immersed in toluene liquid so as to prevent rapid oxidization which may be caused when taken out into air.

A part of the particles were taken out for measurement and stable oxide coating films were formed on the surfaces while evaporating toluene.

TABLE 6

| Example and Comparative example | Coated particles (obtained in) | Heat treatment in a non-reducing atomospher | | Heat treatment in a reducing gas | | Heat treatment in an oxygen-containing gas | | |
|---|---|---|---|---|---|---|---|---|
| | | Temperature (°C.) | Kind of non-reducing atomospher | Temperature (°C.) | Flow rate of $H_2$ (l/min) | Temperature of the furnace (°C.) | Maximum temperature (°C.) | Ratio (air/$N_2$) at the maximum temperture |
| Example 41 | Example 22 | 400 | Air | 390 | 180 | 50 | 75 | 1.2/160 |
| Example 42 | Example 23 | 400 | $N_2$ gas | 400 | 180 | 80 | 160 | 4.0/160 |
| Example 43 | Example 24 | — | — | 380 | 180 | 30 | 54 | 0.8/160 |
| Example 44 | Example 25 | 550 | Air | 400 | 200 | 80 | 105 | 0.8/160 |
| Example 45 | Example 26 | — | — | 360 | 200 | 40 | 72 | 1.6/160 |
| Example 46 | Example 27 | 380 | Air | 370 | 200 | 40 | 74 | 1.6/160 |
| Example 47 | Example 28 | 400 | Air | 360 | 210 | 40 | 81 | 2.0/160 |
| Example 48 | Example 29 | 400 | Air | 430 | 200 | 50 | 73 | 1.2/160 |
| Example 49 | Example 30 | 410 | Air | 400 | 200 | 50 | 82 | 1.6/160 |
| Example | Example | 400 | Air | 370 | 200 | 60 | 83 | 1.2/160 |

TABLE 6-continued

| | | | | | | | | |
|---|---|---|---|---|---|---|---|---|
| 50 | 26 | | | | | | | |
| Comparative example 13 | Comparative example 7 | 410 | Air | 410 | 180 | 50 | 78 | 1.2/160 |
| Comparative example 14 | Comparative example 8 | 400 | Air | 410 | 180 | 50 | 75 | 1.2/160 |
| Comparative example 15 | Comparative example 9 | 400 | Air | 410 | 180 | 50 | 75 | 1.2/160 |

| Example and Comparative example | Coated particles (obtained in) | Properties of the magnetic iron based alloy particles | | | | | |
|---|---|---|---|---|---|---|---|
| | | Particle length (μm) | Aspect ratio (major axial diameter/ minor axial diameter) | Crystallite Size (Å) | Specific surface area (m²/g) | Coercive force (Oe) | Saturation magnetization σs (emu/g) | Reduction ratio of saturation magnetization (%) |
| Example 41 | Example 22 | 0.28 | 15.0/1 | 155 | 49.2 | 1530 | 135.4 | 4.2 |
| Example 42 | Example 23 | 0.30 | 14.0/1 | 160 | 47.8 | 1515 | 117.3 | 0.5 |
| Example 43 | Example 24 | 0.19 | 13.2/1 | 158 | 52.1 | 1620 | 139.5 | 4.9 |
| Example 44 | Example 25 | 0.37 | 15.0/1 | 170 | 45.3 | 1500 | 128.2 | 2.6 |
| Example 45 | Example 26 | 0.14 | 9.5/1 | 145 | 53.1 | 1570 | 136.2 | 4.5 |
| Example 46 | Example 27 | 0.13 | 8.5/1 | 138 | 54.7 | 1530 | 129.4 | 4.2 |
| Example 47 | Example 28 | 0.085 | 7.5/1 | 130 | 59.0 | 1500 | 125.6 | 4.5 |
| Example 48 | Example 29 | 0.25 | 14.5/1 | 165 | 48.2 | 1620 | 136.8 | 3.3 |
| Example 49 | Example 30 | 0.31 | 16.2/1 | 143 | 51.5 | 1635 | 132.4 | 3.6 |
| Example 50 | Example 26 | 0.14 | 9.0/1 | 145 | 53.4 | 1585 | 137.1 | 4.5 |
| Comparative example 13 | Comparative example 7 | 0.21 | 6.0/1 | 215 | 46.8 | 1040 | 155.6 | 17.3 |
| Comparative example 14 | Comparative example 8 | 0.23 | 6.5/1 | 190 | 66.8 | 1335 | 154.2 | 26.2 |
| Comparative example 15 | Comparative example 9 | 0.25 | 10.0/1 | 185 | 59.6 | 1510 | 157.5 | 22.3 |

What is claimed is:

1. A process for producing spindle-shaped magnetic iron based alloy particles comprising the steps of:
    (1) adding an aqueous alkali carbonate solution or a mixture of an aqueous alkali carbonate solution and an aqueous alkali hydroxide solution to an aqueous ferrous salt solution so as to obtain a suspension containing $FeCO_3$ or an Fe-containing precipitate;
    (2) aging the thus-obtained suspension containing $FeCO_3$ or an Fe-containing precipitate at 35° to 60° C. for 50 to 800 minutes at a pH of 7 to 11 in a non-oxidizing atmosphere;
    (3) oxidizing the suspension by passing an oxygen-containing gas into the aged suspension containing $FeCO_3$ or an Fe-containing precipitate in the presence of 0.1 to 10.0 mol % of propionic acid or a salt thereof based on Fe at 35° to 70° C. so as to obtain spindle-shaped goethite particles;
    (4) coating the thus-obtained spindle-shaped goethite particles with at least one compound selected from the group consisting of Ni, Al, Si, P, Co, Mg, B and Zn compounds; and
    (5) heat-treating the coated spindle-shaped particles in a reducing gas to produce reduced particles.

2. A process according to claim 1, further comprising the step of heating and dehydrating said spindle-shaped goethite particles to produce spindle-shaped hematite particles before the coating step.

3. A process according to claim 1, further comprising the step of heat-treating said coated particles at 300° to 800° C. in a non-reducing atmosphere before the heat-treating step.

4. A process according to claim 1, further comprising the step of (6) oxidizing the surfaces of said reduced particles prepared in step (5) in an oxygen-containing gas.

5. A process according to claim 4, wherein the surfaces of said reduced particles are oxidized at 30° to 200° C. in an oxygen-containing gas having an oxygen content of 0.02 to 20 vol %.

6. A process according to claims 1, wherein said propionic acid or a salt thereof is added to said aqueous alkali carbonate solution, said mixture of said aqueous alkali carbonate solution and said aqueous alkali hydroxide solution, said ferrous salt solution, or said suspension containing $FeCO_3$ or an Fe-containing precipitate before the oxidization.

7. A process for producing spindle-shaped goethite particles comprising the steps of: adding an aqueous alkali carbonate solution or a mixture of an aqueous alkali carbonate solution and an aqueous alkali hydroxide solution to an aqueous ferrous salt solution so as to obtain a suspension containing $FeCO_3$ or an Fe-containing precipitate; aging the thus-obtained suspension containing $FeCO_3$ or an Fe-containing precipitate at 35° to 60° C. for 50 to 800 minutes at pH of 7 to 11 in a non-oxidizing atmosphere; and carrying out oxidization by passing an oxygen-containing gas into the aged suspension containing $FeCO_3$ or an Fe-containing precipitate in the presence of 0.1 to 10.0 mol l % of propionic acid or a salt thereof based on Fe at 35° to 70° C.

8. A process according to claim 7, wherein said propionic acid or a salt thereof is added to said aqueous alkali carbonate solution, said mixture of said aqueous alkali carbonate solution and said aqueous alkali hydroxide solution, said ferrous salt solution or said suspension containing $FeCO_3$ or an Fe-containing precipitate before the oxidization.

* * * * *

UNITED STATES PATENT AND TRADEMARK OFFICE
CERTIFICATE OF CORRECTION

PATENT NO. : 5,599,378
DATED : February 4, 1997
INVENTOR(S) : MISHIMA et al

It is certified that error appears in the above-indentified patent and that said Letters Patent is hereby corrected as shown below:

Column 1, Item [30] delete reference to Japanese Patent 325436/88

Signed and Sealed this

Thirtieth Day of September, 1997

*Attest:*

BRUCE LEHMAN

*Attesting Officer*     *Commissioner of Patents and Trademarks*